(12) United States Patent
Sun et al.

(10) Patent No.: US 10,180,600 B2
(45) Date of Patent: Jan. 15, 2019

(54) DISPLAY PANELS AND DISPLAY DEVICES

(71) Applicant: Wuhan China Star Optoelectronics Technology Co., Ltd., Wuhan, Hubei (CN)

(72) Inventors: Haiyan Sun, Guangdong (CN); De-Jiun Li, Guangdong (CN); Yuejun Tang, Guangdong (CN); Chang Xie, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 232 days.

(21) Appl. No.: 14/650,305

(22) PCT Filed: May 18, 2015

(86) PCT No.: PCT/CN2015/079177
§ 371 (c)(1),
(2) Date: Jun. 7, 2015

(87) PCT Pub. No.: WO2016/173007
PCT Pub. Date: Nov. 3, 2016

(65) Prior Publication Data
US 2017/0139254 A1 May 18, 2017

(30) Foreign Application Priority Data

Apr. 30, 2015 (CN) .......................... 2015 1 0222698

(51) Int. Cl.
*G02F 1/1339* (2006.01)
*G02F 1/1335* (2006.01)
(Continued)

(52) U.S. Cl.
CPC ........ *G02F 1/13394* (2013.01); *G02F 1/1368* (2013.01); *G02F 1/133514* (2013.01);
(Continued)

(58) Field of Classification Search
CPC .............. G02F 1/13394; G02F 1/1368; G02F 2001/13398; G02F 2001/136222; G02F 1/1339
(Continued)

(56) References Cited

U.S. PATENT DOCUMENTS 6,323,921 B1 * 11/2001 Kurauchi ............ G02F 1/13394
349/106
8,107,047 B2 * 1/2012 Song ................... G02F 1/13394
349/106
(Continued)

FOREIGN PATENT DOCUMENTS

CN 1963611 A 5/2007
CN 101118297 A 2/2008
(Continued)

*Primary Examiner* — Nathanael R Briggs
(74) *Attorney, Agent, or Firm* — Andrew C. Cheng

(57) ABSTRACT

The display panel includes a first substrate, a second substrate, a color filtering layer, and a spacer. The first substrate includes a non-active area and an active area. The second substrate is opposite to the first substrate. The color filtering layer is arranged on the first substrate. The color filtering layer includes a plurality of color filters, and a through hole is formed between adjacent color filters. One end of the spacer has been arranged within the through hole and the other end of the spacer supports the second substrate. In this way, the stability of the spacer is enhanced and the spacer is prevented from being detached.

12 Claims, 2 Drawing Sheets

(51) Int. Cl.
*G02F 1/1333* (2006.01)
*G02F 1/1368* (2006.01)
*G02F 1/1362* (2006.01)

(52) U.S. Cl.
CPC ............. *G02F 2001/13398* (2013.01); *G02F 2001/136222* (2013.01)

(58) Field of Classification Search
USPC ......................................... 349/106, 110, 155
See application file for complete search history.

(56) References Cited

U.S. PATENT DOCUMENTS

| | | |
|---|---|---|
| 2005/0110922 A1 | 5/2005 | Lee et al. |
| 2006/0226426 A1 | 10/2006 | Park et al. |
| 2010/0165266 A1* | 7/2010 | Sakata ............. B29D 11/00634 349/106 |
| 2010/0231818 A1 | 9/2010 | Min et al. |
| 2011/0122357 A1* | 5/2011 | Chang ............... G02F 1/133512 349/155 |
| 2012/0268699 A1* | 10/2012 | Min .................... G02F 1/13394 349/106 |
| 2013/0169901 A1* | 7/2013 | Kim .................. H01L 29/78633 349/43 |
| 2013/0222723 A1* | 8/2013 | Kim ....................... H01L 33/58 349/40 |

FOREIGN PATENT DOCUMENTS

| | | |
|---|---|---|
| CN | 104317111 A | 1/2015 |
| JP | 4416878 B2 | 2/2010 |
| JP | 2013142748 A | 7/2013 |

\* cited by examiner

DISPLAY PANELS AND DISPLAY DEVICES

BACKGROUND OF THE INVENTION

1. Field of the Invention

The present disclosure relates to liquid crystal display technology, and more particularly to a display panel and a display device.

2. Discussion of the Related Art

The expected display performance of liquid crystal display panels are achieved by controlling electrical fields of the substrates so as to change the alignment of the liquid crystals. In order to obtain an uniform gap between two substrates, gap control materials have to be arranged between the two substrates.

Conventional gap control materials are ball-shaped, which are distributed on the panel by spray. However, there are two disadvantages. First, as the ball-shaped gap control materials are randomly distributed on the panel, distortion and light leakage may occur in an active area. Second, the ball-shaped gap control materials may be aggregated together, which results in dead pixels. In order to overcome the two issues above, photoreaction-LCD gap control materials have been developed. A spacer has been formed by photoetching processes so as to control the gap between the two substrates. However, the spacer may be detached due to frictions caused by the alignment during the manufacturing process, vibrations caused by transportations or by users' knocks. This may result in non-uniform thickness, and thus the display performance is affected.

SUMMARY

The object of the invention is to provide a spacer with greater stability so as to improve the display performance.

In an aspect, a display panel, includes: a first substrate; a second substrate opposite to the first substrate; a color filtering layer being arranged on the first substrate, the color filtering layer comprising a plurality of color filters, and through holes are formed between adjacent color filters; a spacer made by photoresist materials, one end of the spacer has been arranged within the through hole and the other end of the spacer supporting the second substrate; and a black matrix being arranged on the second substrate.

Wherein the other end of the spacer abuts against the black matrix.

In another aspect, a display panel, includes: a first substrate; a second substrate opposite to the first substrate; a color filtering layer being arranged on the first substrate, the color filtering layer comprising a plurality of color filters, and through holes are formed between adjacent color filters; and a spacer, and one end of the spacer being arranged within the through hole and the other end of the spacer supporting the second substrate.

Wherein the display panel further comprises a black matrix being arranged on the second substrate.

Wherein the other end of the spacer abuts against the black matrix.

Wherein a width of the spacer is not greater than the width of the black matrix.

Wherein the spacer is made by photoresist materials.

Wherein the spacer and the color filters are made by the same manufacturing process.

Wherein the spacer comprises an embedded portion and a protrusion portion, and the embedded portion has been embedded within the through hole, and a shape of the embedded portion matches the shape of the through hole.

Wherein the protrusion portion protrudes from the through hole, and a width of a connecting surface between the protrusion portion and the embedded portion is greater than the width of the through hole.

Wherein the display panel comprises a non-active area and an active area, and the spacer is arranged within the non-active area.

In another aspect, a display device, includes: a display panel, the display panel comprises: a first substrate; a second substrate opposite to the first substrate; a color filtering layer being arranged on the first substrate, the color filtering layer comprising a plurality of color filters, and through holes are formed between adjacent color filters; and a spacer, and one end of the spacer being arranged within the through hole and the other end of the spacer supporting the second substrate.

Wherein the display panel further comprises a black matrix being arranged on the second substrate.

Wherein the other end of the spacer abuts against the black matrix.

Wherein a width of the spacer is not greater than the width of the black matrix.

Wherein the spacer is made by photoresist materials.

Wherein the spacer and the color filters are made by the same manufacturing process.

Wherein the spacer comprises an embedded portion and a protrusion portion, and the embedded portion has been embedded within the through hole, and a shape of the embedded portion matches the shape of the through hole.

Wherein the protrusion portion protrudes from the through hole, and a width of a connecting surface between the protrusion portion and the embedded portion is greater than the width of the through hole.

Wherein the display panel comprises a non-active area and an active area, and the spacer is arranged within the non-active area.

In view of the above, the display panel includes a first substrate, a second substrate opposite to the first substrate, a color filtering layer, and a spacer. The color filtering layer is arranged on the first substrate. The color filtering layer includes a plurality of color filters, and through holes are formed between the color filters. One end of the spacer is arranged within the through hole, and the other end of the spacer is bonded with the second substrate so as to control the gap between the two substrates. In addition, as one end of the spacer is received within the through hole, the stability of the spacer is enhanced such that the display performance of the display panel has been enhanced also.

DETAILED DESCRIPTION OF THE EMBODIMENTS

Embodiments of the invention will now be described more fully hereinafter with reference to the accompanying drawings, in which embodiments of the invention are shown.

Figure 1:
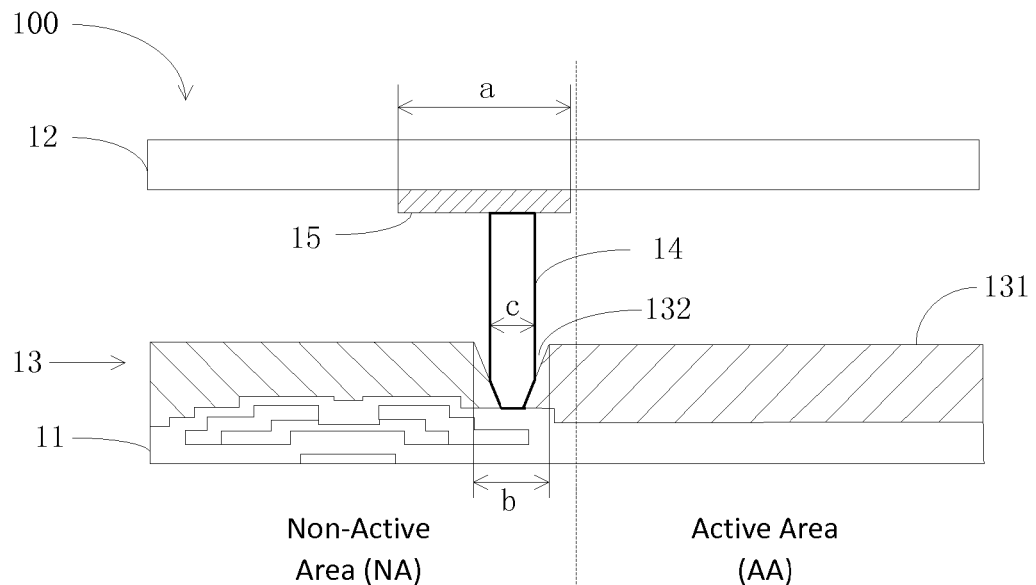
FIG. 1 is a schematic view of the display panel in accordance with a first embodiment.

FIG. 1 is a schematic view of the display panel in accordance with a first embodiment. The display panel 100 includes a first substrate 11, a second substrate 12 opposite to the first substrate 11, a color filtering layer 13, and a spacer 14.

In an example, the display panel 100 is a liquid crystal display panel. The first substrate 11 is a thin-film transistor (TFT) substrate. It can be understood that there is a liquid crystal layer arranged between the first substrate 11 and the second substrate 12. The first substrate 11 includes ITO pixel electrodes arranged thereon. In addition, the first substrate 11 and the second substrate 12 include alignment films arranged thereon. The display panel 100 may include other conventional components, and the corresponding descriptions regarding the conventional components are omitted hereinafter.

As light beams have to pass through the liquid crystal layer and the color filtering layer 13 to display the colors. Usually, the pixel electrodes are arranged on one substrate, and the color filters are arranged on another substrate. Afterward, in the manufacturing process, the first substrate and the second substrate are configured to be opposite to each other, wherein the color filters are aligned with the pixel electrodes. However, as it is difficult to align the color filters with the pixel electrodes, the light beams of different colors may be interfered by each other. In an example, the display panel 100 may adopt the color filter on array (COA) technology. That is, the color filtering layer 13 is formed on the first substrate 11 via photoetching processes so as to enhance the precision of alignment. Correspondingly, the aperture rate of the display panel 100 is increased and the brightness is enhanced.

In an example, the first substrate 11 is opposite to the second substrate 12. The color filtering layer 13 is arranged on the first substrate 11, and the color filtering layer 13 having a plurality of color filters 131. It can be understood that the color filtering layer 13 is formed on the first substrate 11 by the photoetching processes.

Figure 2:
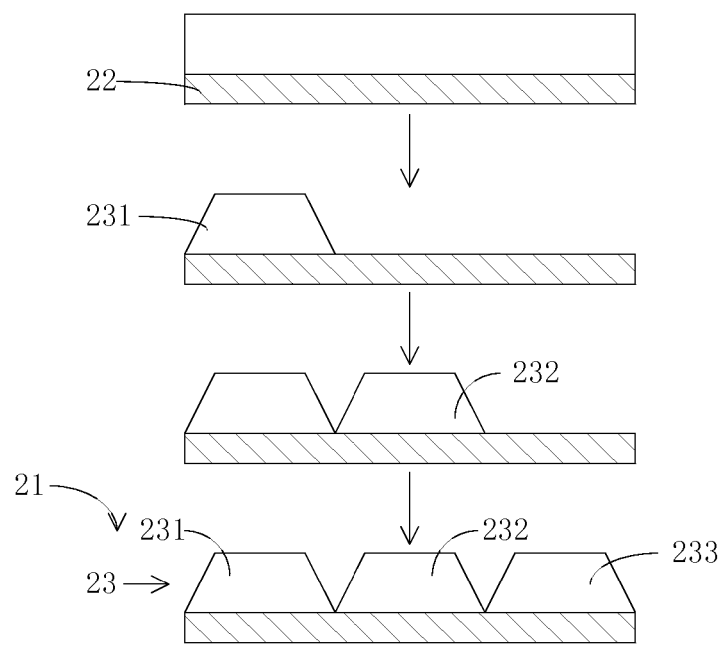
FIG. 2 is a schematic view of the color filtering layer formed on the first substrate of FIG. 1.

FIG. 2 is a schematic view of the color filtering layer formed on the first substrate of FIG. 1. FIG. 2 shows an exemplary pixel structure 21 on the first substrate 11. The pixel structure 21 includes a pixel electrode 22 and a color-filtering layer 23. The color-filtering layer 23 includes color filters for RGB colors. The color filters are formed by the process below. First, a layer of red photoresist is coated on the pixel electrode 22, and then is etched to be the red sheet 231. Afterward, a green sheet 232 and a blue sheet 233 are formed by the similar process.

Referring to FIG. 1, the color filtering layer 13 is formed by the manufacturing process as shown in FIG. 2. Thus, a through hole 132 is formed between adjacent color filters 131. In order to avoid the interference of light beams between the adjacent color filters 131, at least one black matrix 15 is arranged within the display panel 100. In an example, the black matrix 15 is arranged on the second substrate 12, and the black matrix 15 faces toward the through hole 132. In addition, a width of the black matrix 15 ("a") is larger than the width of the through hole 132 ("b"). In another example, the black matrix 15 may be arranged between the color filtering layer 13 and the first substrate 11, and the black matrix 15 faces toward the through hole 132.

In an example, the first substrate 11 is the TFT substrate. The semiconductor portion of the TFT and the black matrix 15 cooperatively define a non-active area (NA). In addition to the non-active area, the display panel 100 also includes an active area (AA), and the spacer 14 is arranged within the non-active are (NA).

In an example, one end of the spacer 14 has been arranged within the through hole 132 and the other end of the spacer 14 abuts against the black matrix 15 of the second substrate 12. When the black matrix 15 is arranged between the color filtering layer 13 and the first substrate 11, the other end of the spacer 14 directly supports the second substrate 12.

The spacer 14 is made by photoresist materials, which is also known as photoreaction-LCD gap control material. The spacer 14 is formed by the same manufacturing process with the that of the color filters 131, which also needs to be coated and etched. In the end, the spacer 14 is pillar-shaped so as to control a thickness between the first substrate 11 and the second substrate 12. According to the manufacturing process of the spacer 14, it can be understood that the spacer 14 is formed directly within the through hole 132, and the spacer 14 is formed as pillar-shaped. In other words, the spacer 14 is not formed to be pillar-shaped and then be embedded into the through hole 132. In this way, the spacer 14 is more stable, and is prevented from being detached from the through hole 132. In an example, the width of the spacer 14 ("c") is smaller than that of the through hole 132 ("b"). In addition, the width of the spacer 14 ("c") is smaller than that of the black matrix 15 ("a"). In real scenarios, the above-mentioned width "a", "b" and "c" may be variable due to precision of manufacturing process. Thus, the above comparison is made by comparing the maximum values. In another example, the spacer 14 may not be pillar-shaped. With the increase of the height, the spacer 14 may be cone-shaped. In other examples, the width "c" may be the same with the width of the through hole ("b"). Comparing to the circumstance where "c"<"b", the spacer 14 may be more stable for the circumstance where "c" equals to "b."

Figure 3:
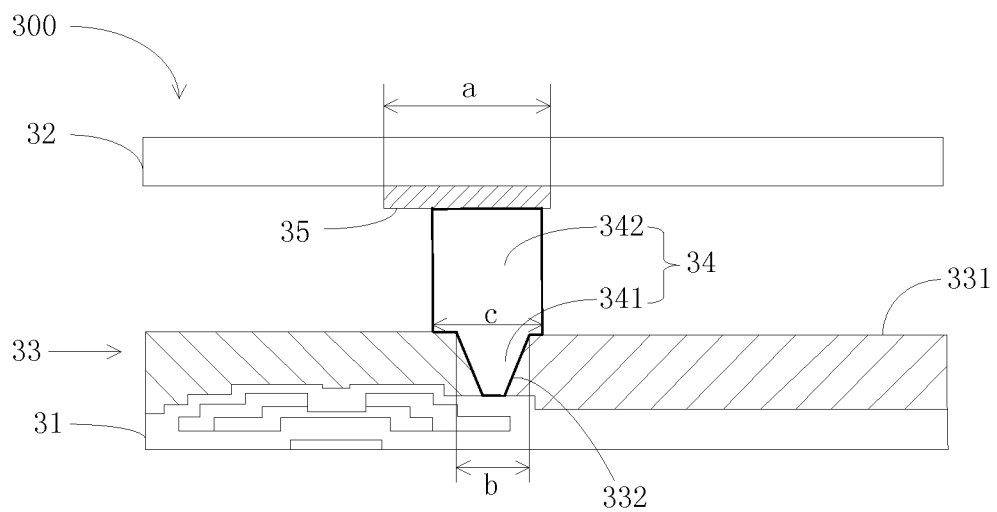
FIG. 3 is a schematic view of the display panel in accordance with a second embodiment.

Similarly, in an example, the width "c" may be greater than the width of the through hole ("b"). FIG. 3 is a schematic view of the display panel in accordance with a second embodiment. The display panel 300 includes a first substrate 31, a second substrate 32, a color-filter layer 33, and a spacer 34. The color-filter layer 33 includes a plurality of color filters 331. A through hole 332 is formed between the adjacent color filters 331. The structure of the display panel 300 is similar to that of the display panel 100, except for the dimension of the spacer 34.

In an example, the spacer 34 includes an embedded portion 341 and a protrusion portion 342. The embedded portion 341 is embedded within the through hole 332, and the shape of the embedded portion 341 is configured to be matched that of the through hole 332. The protrusion portion 342 protrudes from the through hole 332. The width of a connecting surface between the protrusion portion 342 and the embedded portion 341 ("c") is greater than the width of the through hole ("b"). With such configuration, the stability of the spacer 34 is enhanced.

In an example, the protrusion portion 342 is pillar-shaped. It can be understood that the protrusion portion 342 may be cone-shaped when the height of the protrusion portion 342 has been increased. During the manufacturing process of the display panel 300, the first substrate 11 and the second substrate 12 are assembled after the spacer 34 is formed. Thus, the width of the spacer 34 ("c") is not greater than the width of the black matrix 35 ("a"). It can be understood that the aperture rate of the display panel 300 may be affected to some extent when the width of the spacer 34 ("c") is huge. When the width of the spacer 34 ("c") equals to the width of the black matrix 35 ("a"), the spacer 34 may operate as the black matrix 35, and thus the black matrix 35 may be omitted.

Figure 4:
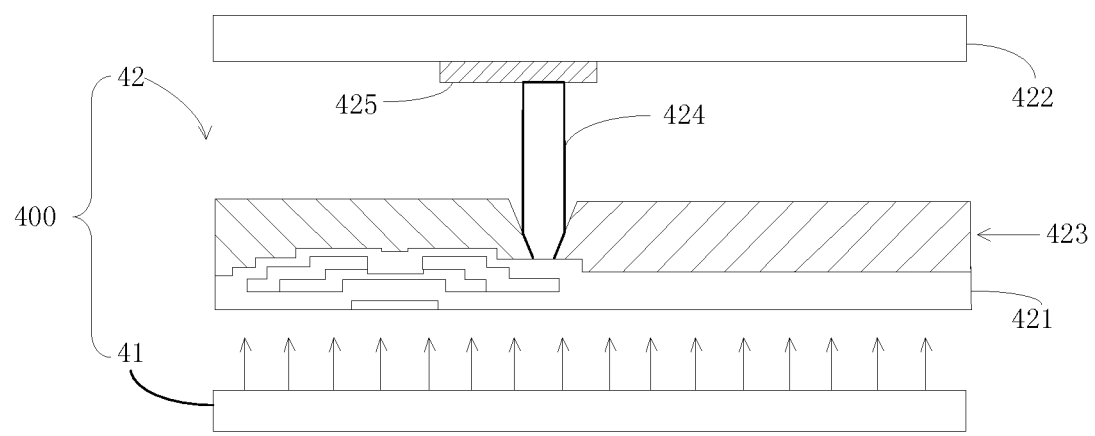
FIG. 4 is a schematic view of the display device in accordance with one embodiment.

FIG. 4 is a schematic view of the display device in accordance with one embodiment. In an example, the display device 400 includes a backlight module 41 and a display panel 42. The backlight module 41 emits the light beams passing through the display panel 42 so as to display images. The display panel 42 is similar to the above-mentioned display panel 100 and the display panel 300. In an example, the display panel 42 may include a first substrate 421, a second substrate 422, a color filtering layer 423, a spacer 424, and a black matrix 425.

As the spacer 424 has been arranged in a stable location, the spacer 424 is prevented from being detached during the transportation of the display device 400.

In view of the above, the display panel includes a first substrate, a second substrate opposite to the first substrate, a color filtering layer, and a spacer. The color filtering layer is arranged on the first substrate. The color filtering layer includes a plurality of color filters, and through holes are formed between the color filters. One end of the spacer is arranged within the through hole, and the other end of the spacer is bonded with the second substrate so as to control the gap between the two substrates. In addition, as one end of the spacer is received within the through hole, the stability of the spacer is enhanced such that the display performance of the display panel has been enhanced also.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A display panel, comprising:
    a first substrate;
    a second substrate opposite to the first substrate;
    a color filtering layer being arranged on the first substrate, the color filtering layer comprising a plurality of color filters, and through holes are formed between every two of the adjacent color filters of different colors; and
    a spacer comprising an embedded portion and a protrusion portion, a shape of the embedded portion is similar to a shape of the through hole, the embedded portion further comprising a first end contacting with the first substrate and a second end contacting with the protrusion portion, and a width of the through hole being configured to be gradually increased along a direction from the first end to the second end such that the embedded portion being closely received within the through hole, and the protrusion portion abuts against at least one black matrix being arranged on the second substrate.

2. The display panel as claimed in claim 1, wherein a width of the protrusion portion of the spacer is not greater than the width of the black matrix.

3. The display panel as claimed in claim 1, wherein the spacer is made by photoresist materials.

4. The display panel as claimed in claim 3, wherein the spacer and the color filters are made by the same manufacturing process.

5. The display panel as claimed in claim 1, wherein the protrusion portion protrudes from the through hole, and a width of a connecting surface between the protrusion portion and the embedded portion is greater than the width of the through hole.

6. The display panel as claimed in claim 1, wherein the display panel comprises a non-active area and an active area, and the spacer is arranged within the non-active area.

7. A display device, comprising:
    a display panel, the display panel comprises:
    a first substrate;
    a second substrate opposite to the first substrate;
    a color filtering layer being arranged on the first substrate, the color filtering layer comprising a plurality of color filters, and through holes are formed between every two of the adjacent color filters of different colors; and
    a spacer comprising an embedded portion and a protrusion portion, a shape of the embedded portion is similar to a shape of the through hole, the embedded portion further comprising a first end contacting with the first substrate and a second end contacting with the protrusion portion, and a width of the through hole being configured to be gradually increased along a direction from the first end to the second end such that the embedded portion being closely received within the through hole, and the protrusion portion abuts against at least one black matrix being arranged on the second substrate.

8. The display device as claimed in claim 7, wherein a width of the spacer is not greater than the width of the black matrix.

9. The display device as claimed in claim 7, wherein the spacer is made by photoresist materials.

10. The display device as claimed in claim 9, wherein the spacer and the color filters are made by the same manufacturing process.

11. The display device as claimed in claim 7, wherein the protrusion portion protrudes from the through hole, and a width of a connecting surface between the protrusion portion and the embedded portion is greater than the width of the through hole.

12. The display device as claimed in claim 7, wherein the display panel comprises a non-active area and an active area, and the spacer is arranged within the non-active area.

* * * * *